G. AVELINE.
AUTOMATIC STABILIZING OR CONTROLLING MEANS FOR AIRCRAFT.
APPLICATION FILED JAN. 17, 1920.

1,379,895.

Patented May 31, 1921.
7 SHEETS—SHEET 1.

G. AVELINE.
AUTOMATIC STABILIZING OR CONTROLLING MEANS FOR AIRCRAFT.
APPLICATION FILED JAN. 17, 1920.

1,379,895.

Patented May 31, 1921.

G. AVELINE.
AUTOMATIC STABILIZING OR CONTROLLING MEANS FOR AIRCRAFT.
APPLICATION FILED JAN. 17, 1920.

1,379,895.

Patented May 31, 1921.
7 SHEETS—SHEET 3.

G. AVELINE.
AUTOMATIC STABILIZING OR CONTROLLING MEANS FOR AIRCRAFT.
APPLICATION FILED JAN. 17, 1920.

1,379,895.

Patented May 31, 1921.
7 SHEETS—SHEET 6.

G. AVELINE.
AUTOMATIC STABILIZING OR CONTROLLING MEANS FOR AIRCRAFT.
APPLICATION FILED JAN. 17, 1920.

1,379,895.

Patented May 31, 1921.
7 SHEETS—SHEET 7.

UNITED STATES PATENT OFFICE.

GEORGES AVELINE, OF SOHO, LONDON, ENGLAND, ASSIGNOR TO RAYMOND ROZE-PERKINS, OF KENSINGTON, LONDON, ENGLAND; HENRY PAGET-COOKE AND EDITH ANNIE HAMILTON DOUGLAS-HAMILTON EXECUTORS OF SAID RAYMOND ROZE-PERKINS, DECEASED.

AUTOMATIC STABILIZING OR CONTROLLING MEANS FOR AIRCRAFT.

1,379,895.      Specification of Letters Patent.      Patented May 31, 1921.

Application filed January 17, 1920. Serial No. 352,187.

*To all whom it may concern:*

Be it known that I, GEORGES AVELINE, a citizen of the French Republic, residing at 40 Frith street, Soho, in the county of London, England, have invented certain new and useful Improvements in or Relating to Automatic Stabilizing or Controlling Means for Aircraft, of which the following is a specification.

This invention relates to automatic stabilizing or controlling apparatus for use on aircraft particularly aeroplanes and has general reference to the kind of apparatus in which a gravity influenced member for example a mass of mercury is provided for the purpose of enabling relative movement between it and its support or container to take place under certain conditions during flight as for instance when the aircraft angularly moves in order to establish electrical circuits for operating means which actuate a contrivance connected to and adapted to move the aircraft controls.

According to this invention the improved stabilizing or controlling apparatus which comprises a gravity influenced member such as a mercury column in a tube or container for electrically operating means which actuates a contrivance connected to and adapted to move the aircraft controls is so constructed and arranged that after the contrivance has been actuated to move the controls to right the aircraft or restore it to its normal flying position as a result of the relative displacement between the mercury and its container and the consequent operation of the electrical means, the said electrical means are again operated on or by the righting movement of the aircraft taking place in order to effect the reverse movement of the said contrivance thereby positively moving the controls in the opposite direction so as to restore them to the normal or required position. A semi-circular mercury column is preferably employed and is contained in a circular tube in which electrical contacts are disposed above the two ends of the mercury column. According to the direction of relative displacement between the mercury column and its container, one end or the other of the mercury column establishes electrical circuits for operating electromagnets which control the contrivance connected to the aircraft controls. After the contrivance has moved in one direction to move the controls and right the aircraft, it is automatically moved in the opposite direction to restore the controls as the result of energization of electro-magnets caused by relative displacement between the mercury and its container in a direction opposite to that which took place when the controls were moved to right the aircraft. One stabilizing apparatus may be employed for lateral control and a separate apparatus for fore and aft or longitudinal control and in the former case the mercury container is disposed in a transverse plane of the aeroplane, while in the latter case the mercury container is disposed in the longitudinal plane of the aircraft. In order to insure that the operation of the mercury and its container can take place nothwithstanding certain forces or conditions which might in the ordinary way prevent the operation the mercury column is placed under the influence of wind pressure or suction produced as a result of the flight of the aircraft preferably by means of suitable Venturi, Badin or similar tubes connected to the mercury container. In the case of lateral control, two Venturi or similar tubes are disposed with their axes in the direction of flight at extended positions on the wings one on each side of the body or fuselage of the aircraft. The Venturi tubes arranged in this manner may be so connected to the mercury container that the two ends of the mercury column are under the influence of pressure or suction thus if the mercury tends to be affected by centrifugal force when the aircraft banks or turns, a differential suction or pressure effect on the ends of the mercury column takes place and counteracts the effect of centrifugal force so that the desired relative movement between the mercury column and its container can take place. In the case of fore and aft control the mercury container which as stated above is disposed in a longitudinal plane of the aircraft is connected to a Venturi or similar tube disposed in a neutral position on the aircraft in such manner that the two ends of the mercury column are under the influence of differential pressures say by one end being under the influence of suction and the other under pressure. The mercury is therefore normally maintained by the suction effect in such a position that a straight line drawn through the ends of the mercury column is at an angle of about 45 degrees to the horizontal instead of being normally horizontal as in the case of lateral control. Thus variations in the suction effect due to changes in speed or longitudinal angular movement of the aircraft enable relative movement between the mercury and its container to take place for the purpose aforesaid. The contrivance which is connected to the aircraft controls may comprise a cylinder containing a double-ended piston geared to a lever connected to the aircraft controls, the piston being adapted to be displaced in the cylinder by air pressure controlled by valves which are electrically controlled as a result of the relative movement which takes place between the mercury and its container. The extent of movement of the piston and the aircraft controls is dependent upon the amount of relative displacement between the mercury and its container, and the movement of the piston at the end of or during its effective stroke or operation is utilized to control the electric means and valves in such manner that the return movement of the piston is effected for the purpose of returning the aircraft controls and the stabilizing apparatus to the normal or required position on the aeroplane being righted. A pump may be provided for supplying air to the aforesaid cylinder and a main hand controlled valve is also provided which may be operated to render the stabilizing or controlling apparatus operative or inoperative; the said valve may also be associated with a switch in order that the electrical current may be switched on and off simultaneously with the operation of the main valve for placing the apparatus in the operative or inoperative conditions. Various methods of controlling the said electrical means and the air supply may be utilized, but in each case the operation of the apparatus is dependent upon the relative displacement between the mercury column and its container. The control of the mercury columns as aforesaid in order to insure of the proper working of the mercury switch taking place under all conditions is an important feature of the invention. The mercury in the transverse position and controlled in the manner aforesaid, provides or forms an inclinometer or course indicator which will enable the pilot to know when the aeroplane is deviating from the required course. One advantage of the invention is the elimination of rotating or gyroscopic mechanism and the absence of clutching mechanism for placing the apparatus in operative connection with the aeroplane controls. In the present invention the aeroplane controls are at all times connected to the apparatus; the latter however does not interfere with the pilot's control of the aeroplane when desired as it is rendered inoperative so far as its automatic action is concerned, by actuating the main controlling valve which places each end of the aforesaid cylinder in communication with atmosphere so that the piston in the cylinder is free to move in either direction when the pilot moves the controls. Generally, a current of about twelve volts is used for operating the aforesaid electromagnets and in order that this current is not employed at the contacts in the mercury switch, relay devices may be provided which may be operated by comparatively small currents, say two volts, so that the relays when energized complete circuits containing the aforesaid twelve volt electro-magnets. Means may however be employed whereby the operation of the valves controlling the supply of air to the cylinder is effected by the use of small voltage electro-magnets. In connection with the apparatus employed for fore and aft control, it may be desirable to employ a switch device which operates more quickly than the aforesaid mercury switch in order to effect the initial energization of the electro-magnets or the relays controlling the same after which the control is taken up by the mercury switch. The supplementary and preliminary switch which may be employed may comprise a device operated by wind pressure through a combined Pitot and static pressure tube; this device may be in the form of an ordinary speed indicator such as often used on aircraft. In some instances for example on small aeroplanes, the piston motor may be substituted by a motor which comprises gearing actuated by a wind driven fan, the arrangement being such that upon the electrical circuits being completed as a result of the relative displacement between the mercury and its container, electro-magnets are operated which move the gearing so that one or other of oppositely rotating wheels are brought into contact with a wheel which is then rotated to impart rotation in one direction or the other to the shaft connected to the air craft controls, according to the direction of displacement between the mercury and its container.

In order that the said invention may be clearly understood and readily carried into effect, the same will now be described more fully with reference to the accompanying drawings, in which—

Fig. 18 is a detail view of a modification hereinafter referred to.

Figs. 19, 20, 21 and 22 are respectively a plan, a front view, a rear view and an end view of a modification in which the contrivance connected to the aircraft controls is operated by means of a wind driven fan.

The construction of the contrivance shown in Figs. 1 to 4 will first be described as the general features thereof are employed in the various modifications either when the apparatus is employed for controlling the aeroplane in the transverse direction or in the longitudinal direction whereas most of the other figures refer to parts or arrangements which vary according as to whether the apparatus is used for the transverse or lateral control of the aeroplane or the longitudinal or fore and aft control thereof.

Referring particularly to Figs. 1 to 4, A is the cylinder containing two pistons B B$^x$ connected together by a rod or bar C so as to form a double ended piston (hereinafter termed the piston B); the upper part of the rod or bar C is provided with a toothed rack C' which is in mesh with a pivoted or angularly movable toothed sector D secured to a spindle E which is mounted in suitable bearings E' (Fig. 3) supported on extensions or uprights A', A' on the cylinder A. Secured to the spindle E is a lever F which is connected to either the lateral or the longitudinal controls according to the use of the apparatus.

Figure 1:
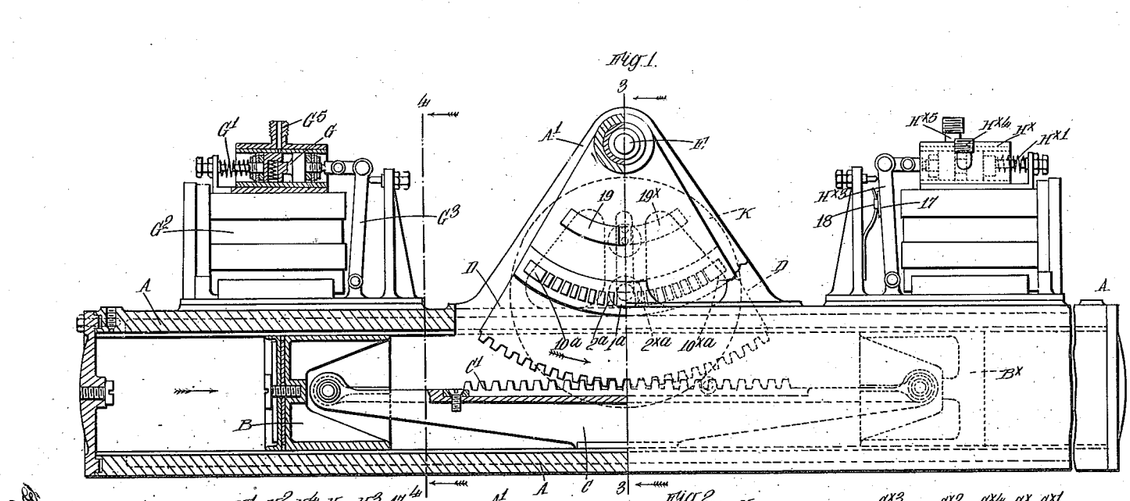
Figures 1 and 2 are respectively an elevation (partly in section) and a plan of one construction of the contrivance which is connected to and effects the movement of the aeroplane controls.
Figure 2:
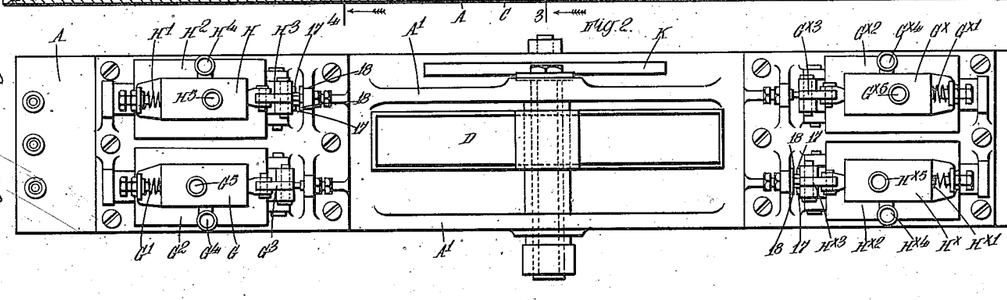
Figure 8:
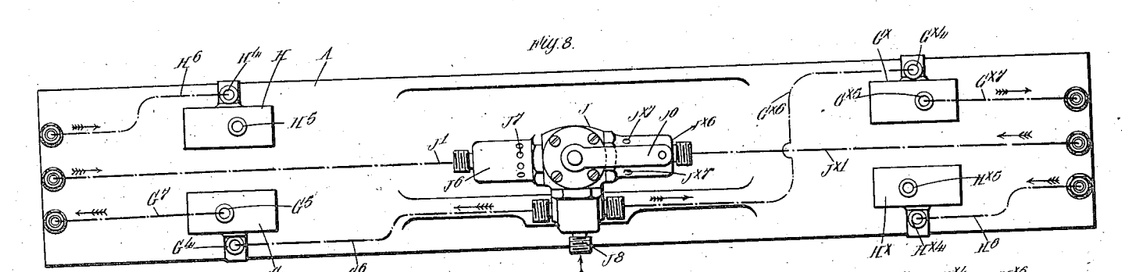
Fig. 8 is a diagrammatic plan view showing the arrangement of the pipe connections for the air supply.

The piston B is adapted to be displaced in either direction in the cylinder by means of air pressure at either end of the cylinder, and for the purpose of controlling the air supply an inlet valve G and an exhaust valve H are provided at the left end of the cylinder, while an inlet valve G$^x$ and an exhaust valve H$^x$ are provided at the right end of the cylinder the arrangement of the several valves being shown more clearly in Figs. 2 and 8. Throughout the specification the index "x" applied to the reference letters or numerals indicate parts at the right side of the apparatus which have corresponding parts at the left side which are designated by similar reference letters or numerals without the index "x." As indicated in Fig. 1 the said valves may be of the piston type, and each valve is normally maintained in a definite or normal position relatively to suitable ports in the valve casing by means of springs G', H', G$^x$, H$^{x'}$, respectively (see Figs. 1 and 2. The aforesaid valves are adapted to be operated or moved as or in the order required against the action of the springs as a result of the energization of electric coils G$^2$, H$^2$, G$^{x2}$, H$^{x2}$, which when energized attract pivoted armatures G$^3$, H$^3$, G$^{x3}$, H$^{x3}$ connected to the respective piston valves so as to move the said valves against the action of the said springs. The energization of the said coils is effected by the completion of electrical circuits caused by the engagement of the mercury column K' (see Fig. 6) with suitably disposed contacts in the mercury container K when relative movement takes place between the mercury column and its container, as hereinafter explained in describing the operation of the apparatus. The inlet and exhaust valves G and H are each provided with two ports G$^4$, G$^5$, H$^4$, H$^5$, respectively (see Figs. 2 and 8) and the inlet and exhaust valves G$^x$ and H$^x$ are each provided with two ports G$^{x4}$, G$^{x5}$ and H$^{x4}$ H$^{x5}$ respectively and as shown in Fig. 8 the ports G$^4$ g$^{x4}$ pertaining to the inlet valves G, G$^x$ are connected by pipes G$^6$, G$^{x6}$ to the main hand controlling valve J while the ports G$^5$, G$^{x5}$ also pertaining to the inlet valves G, G$^x$ are connected to the respective end spaces of cylinder by pipes G$^7$, G$^{x7}$. The ports H$^4$, H$^{x4}$ pertaining to the exhaust valves H, H$^x$ are connected to the respective end spaces of the cylinder by pipes H$^6$ H$^{x6}$ while the other ports H$^5$, H$^{x5}$ also pertaining to the exhaust valves are open to atmosphere; the two end spaces of the cylinder are connected by pipes J', J$^{x'}$ to the main valve J as shown in Figs. 8 and 9. Normally the inlet valves G, G$^x$ are maintained by their springs G', G×' in a position to shut off communication to the respective ends of the cylinder and the exhaust valves H, H×' are maintained in position by their springs H', H×' to enable the respective end spaces of the cylinder to be open to atmosphere. The main controlling valve J comprises an angularly movable cam J² see Fig. 9 adapted to coöperate with and control the position of three plungers J³, J×³, J⁴ in three branches J⁵, J×⁵, J⁶ of the main valve casing.

The plungers J³, J×³ are spring pressed against the cam J² and each controls ports J⁷, J×⁷ in its respective branch so that the ports J⁷, J×⁷ may be closed or placed in communication with the pipes J' and J×, to place the ends of the cylinder in communication with atmosphere through the said ports J⁷, J×⁷. The third plunger J⁴ controls the supply of compressed air from the main inlet J⁸ connected to a pump (not shown) to the pipes G⁶, G×⁶ leading to the inlet valves G, G×. When the cam J² and the two plungers J³, J×³ are in the position shown in Fig. 9, the ports J⁷, J×⁷ are open so that the end spaces of the cylinder are opened to atmosphere while the other plunger J⁴ closes the pipes G⁶, G×⁶ leading to the inlet valves G and G×, thus shutting off the supply of air from the pump. Thus when the cam J² is in this position the stabilizing apparatus is rendered inoperative as regards its automatic control and the electrical current is at this time cut off as the ends of the cylinder are at this time open to atmosphere through the pipes J', J×' and the ports J⁷, J×⁷ so that the piston B is free to move in either direction when the aeroplane controls (which as aforesaid are connected to the piston B by the lever F) are operated by the pilot. When it is desired to enable the automatic control to be effected the cam J² is angularly moved through an angle of 90° by means of the handle J⁰ see Fig. 8 thus forcing the plungers J³, J×³ outwardly against their springs to close the ports J⁷, J×⁷ and thus close the end spaces of the cylinders; at the same time the compressed air through the main inlet J⁸ will move the valve against the smaller part of the cam so that the pipes G⁶, G×⁶ are placed in communication with the main air inlet J⁸ so that the apparatus is then ready for operation assuming the electrical current has been switched on. The electrical switch may be connected to or operated by the handle J⁰ so that the current is switched on simultaneously with the opening of the main air inlet J⁸ from the pump, this operation being readily effected by the aeroplane pilot and the current may be switched off simultaneously with the cutting off of the air supply by moving the cam to the position shown in Fig. 9. The above description generally sets forth the construction of the apparatus which will be further described particularly with regard to the electrical connections in setting forth the operation of the apparatus.

Figure 6:
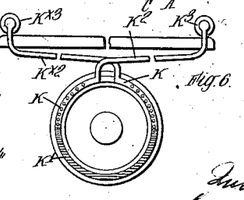
Fig. 6 is a diagrammatic view illustrating the method of controlling the mercury column in the case of the apparatus being used for controlling the aeroplane in the transverse direction.
Figure 7:
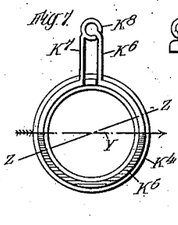
Fig. 7 is a diagrammatic view illustrating the method of controlling the mercury column in the case of the apparatus being utilized for controlling the aeroplane in the longitudinal direction.

In the case of controlling the aeroplane in the transverse direction, the contrivance shown in Fig. 1 is arranged in the transverse plane of the aeroplane, and is employed in conjunction with the mercury container shown in Fig. 6, the lever F being connected to the lateral controls of the aeroplane, and in the case of controlling the aeroplane in the longitudinal or fore and aft direction, a contrivance such as shown in Fig. 1 is arranged in a longitudinal plane of the aeroplane, and is employed in conjunction with the mercury device shown in Fig. 7 the lever F in this case being connected to the longitudinal controls of the aeroplane. In both cases, the general operation of the apparatus is, as aforesaid, caused by reason of the relative displacement between mercury container K and the mercury column K' which results in the completion of electric circuits, so as to energize the aforesaid coils G², H², G×², H×² thus moving the said inlet and exhaust valves so that the air pressure may move the piston B and consequently operate the aeroplane controls.

Figure 3:
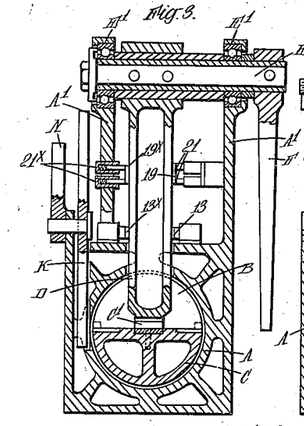
Figs. 3 and 4 are transverse sectional views taken respectively on the lines 3—3 and 4—4 of Fig. 1.
Figure 4:
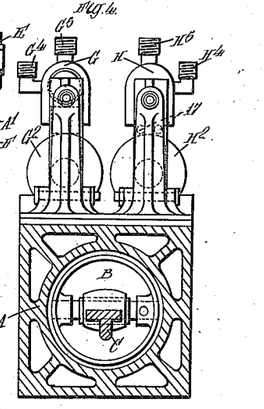
Figure 5:
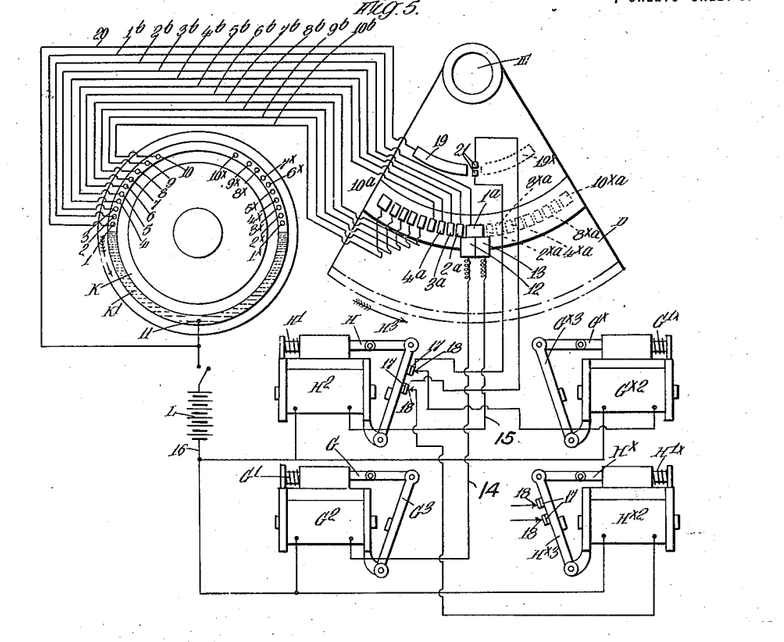
Fig. 5 is a diagrammatic view of the electrical connections according to one embodiment of the invention.

When the apparatus is employed for controlling the aeroplane in the transverse direction, the container or tube K containing the mercury K' is fixed in a vertical or substantially vertical plane transverse of the aeroplane and in practice it may be secured to the cylinder A as shown in Figs. 1 and 3. As shown in Fig. 5, two series of electric contacts 1 to 10 and 1× to 10× are provided in the tube or container K on the left and right sides respectively above each end of the mercury column K' and are so arranged that when the container K is angularly displaced due to the aeroplane banking or turning, one series of contacts successively engages with the mercury column according to the direction of angular movement of the aeroplane. It is important that the mercury column K' should be maintained at all times in the position shown in Fig. 5 and in order to insure that the mercury column will remain in that position, the left side of the container K may be connected by means of a pipe K² to a Venturi, Badin or similar tube K³ at the tip of the wing on the right side of the aeroplane, while the right side of the container is similarly cross connected by a pipe K×² to a Venturi or other tube K×³ at the tip of the wing at the left side of the aeroplane. By means of this cross connection of the container K to the Venturi or similar tubes K³, K×³ the two ends of the mercury column may be placed under the influence of suction when the aeroplane is flying, and when it is flying level, the suction effect at the two ends of the mercury column is balanced or equal. Should the aeroplane bank or turn to the left, the action of centrifugal force tends to displace the mercury column to the right, but owing to the greater speed of the raised right wing tip in moving in a larger circular path than the depressed left wing tip, the suction from the Venturi tube $K^3$ to the left side of the mercury column will be greater than the suction on the right side thereof, so that the tendency for the mercury to move from left to right due to the action of centrifugal force is counteracted. A similar action takes place when the aeroplane banks or turns in the opposite direction, and in this manner the mercury column can be maintained in a position in which its ends lie in a horizontal plane irrespective of the transverse angular position of the aeroplane. Instead of utilizing the suction effect to control the mercury column, pressure may be used, in which case it would not be necessary to make the aforesaid cross connections, as the Venturi or similar tube on the right wing tip would be connected to the right side of the mercury column, and the Venturi tube at the left wing tip would be connected to the left side of the mercury column.

As shown in Fig. 5 a contact piece 11 is placed in the lower part of the mercury container and it is connected to the positive terminal of a battery L or other source of electric supply, so that the mercury column constitutes a conductor which is adapted to coöperate with either series of contacts 1 to 10 or $1^x$ to $10^x$ in the mercury container according to the direction of banking or turning of the aeroplane. The aforesaid sector D may carry a set of contacts $1^a$—$10^a$ on one face connected by conductors $1^b$—$10^b$ to the set of contacts 1 to 10 on the left side of the mercury container and a second set of contacts $1^{xa}$ to $10^{xa}$ on the other face of the sector is similarly connected to the series of contacts $1^x$ to $10^x$ on the right side of the mercury container. The contacts $1^a$ to $10^a$ on the sector D are adapted to coöperate with two brushes 12 and 13 fixed on the cylinder extensions A', A' and connected to the coils $G^2$, $H^2$ by conductors 14 and 15 as shown in Fig. 5, which coils are also connected to the negative terminal of the battery by a conductor 16. In Fig. 5 the necessary electrical connections are shown for effecting the controlling operation when the aeroplane turns or banks to the left only, and it will be understood that duplicate corresponding connections (indicated where illustrated by similar reference letters or numerals with the index "x") are provided to enable the controlling operation to be effected when the aeroplane banks or turns to the right. When the aeroplane is flying level, the ends of the mercury column do not make contact with the adjacent series of contacts 1 to 10 or $1^x$ to $10^x$ but if the aeroplane banks or turns to the left so that its left wing is lower than the right the contacts 1 to 10 will successively plunge into the adjacent end of the mercury column which as stated above is connected to the battery L. Assuming the main valve J has been moved to open the main air inlet $J^8$ and to switch on the electrical current a circuit is immediately established by the contact 1 on the container K, conductor $1^b$, contact $1^a$ on the sector, the two stationary brushes 12 and 13, conductors 14 and 15 the two coils $G^2$ $H^2$ and back to the battery by the conductor 16; the coils $G^2$ $H^2$ thus become energized so as to actuate the armatures $G^3$ $H^3$ which move the inlet and exhaust valves G H at the left end of the cylinder A against the action of their springs G', H' so that the inlet valve G opens and the exhaust valve H closes. Immediately the inlet valve G is opened, air is admitted from the main valve J through the pipe $G^6$ and the pipe $G^7$ to the left end space of the cylinder and the piston B is thereby moved to the right and transmits movement by the aforesaid toothed rack C' to the sector D (and the lever F connected to aeroplane control) thereby causing the contacts $1^a$, $2^a$, etc., on the sector to successively engage with the two fixed brushes 12 and 13. The extent of movement depends upon the amount of relative displacement between the mercury column and the contacts 1 to 10. Supposing the angular movement of the aeroplane and the relative movement between the mercury and its container are such that the contacts 1, 2, 3 engage with the mercury and the contact 4 is not in contact with the mercury column the movement of the piston by the compressed air will continue until the contact $4^a$ on the sector connected with the contact 4 in the mercury container K engages with the stationary brush 12 with the result that the current then does not flow through the inlet valve coil $G^2$ which therefore becomes deënergized, and allows the inlet valve G to be closed by its spring. The supply of compressed air is therefore cut off and the movement of the piston B and the sector D is stopped. The sector D having been moved, has moved or actuated the aeroplane controls to restore the aeroplane to its horizontal position so that during the restoring or return movement of the aeroplane relative movement between the mercury column K' and its container K takes place in the opposite direction; therefore the contacts 1, 2 and 3 which entered the mercury, successively leave the mercury and as the contact 3 leaves the mercury, it breaks the circuit through the contact $3^a$ on the sector in contact with the second stationary brush 13 and thus causes the exhaust valve coil $H^2$ to become deënergized so that the exhaust valve H is opened by reason of its spring H. The armature $H^3$ connected to the exhaust valve is provided with two contact pieces 17, 17, adapted to engage with two contacts 18, 18 so as to form a switch, see Figs. 1, 2, 4 and 5 and thus the exhaust valve H in opening allows the armature to complete an independent circuit, which results in the energization of the two coils $G^{x2}$ $H^{x2}$, pertaining to the inlet and exhaust valves $G^x$, $H^x$ at the right end of the cylinder thereby opening the inlet valve $G^x$ and closing the exhaust valve $H^x$, so that the compressed air is admitted to that end of the cylinder and effects the return movement of the piston B, the toothed sector D, and the aeroplane controls to the normal position. The independent circuit controlled by the opening of each exhaust valve and the consequent movement of the respective armatures may be effected by a contact 19 on the sector D connected to the positive terminal of the battery L by a conductor 20 this contact 19 being so arranged as to engage with two fixed brushes 21, 21 connected by conductors 22 to the armature switch contacts 17 and 18 which are connected by conductors 23 to the coils $G^{x2}$ $H^{x2}$ of the inlet and exhaust valves which coils are connected to the negative terminal of the battery as shown in Fig. 5. When the piston B after being returned has reached its normal or neutral position shown in Fig. 1 the brushes 21, 21 are out of engagement with the contact 19 and the coils $G^{x2}$ $H^{x2}$ are deënergized so that the inlet and exhaust valves $G^x$, $H^x$ at the right end of the cylinder are restored to their normal positions by their springs. At this time also the contacts 1 to 10 on the container K are out of engagement with the mercury and the various parts are in the normal position.

If the aeroplane banks or turns in the opposite direction so that the right wing tip is lower than the left, the contacts $1^x$ to $10^x$ successively engage with right end of the mercury column and a similar operation to that above described takes place through the contacts $1^x$ to $10^x$ and two similar brushes $12^x$ and $13^x$ and the duplicate connections above mentioned for enabling compressed air to be admitted first to the right end of the cylinder by the valve $G^x$ which results in the piston B, the sector D, B and the aeroplane controls being operated so that the aeroplane is restored to its horizontal position and then to the left end of the cylinder to restore the piston B, sector D and the aeroplane controls to the normal or neutral position.

When the apparatus is to be used for stabilizing or controlling the aeroplane in the fore and aft or longitudinal direction, the cylinder A is as aforesaid arranged in a longitudinal plane of the aeroplane and the lever F is connected to the longitudinal controls but the various electrical and air supply connections and the operation are similar to that above described, the operations being as aforesaid dependent upon the relative displacement between the mercury and its container. In this case however, the mercury container $K^4$ see Fig. 7 is disposed in a longitudinal plane of the aeroplane by being carried on the cylinder as previously explained and the control of the mercury $K^5$ in order to maintain it in the required position is effected by means of two pipes $K^6$, $K^7$ leading from above the two ends of the mercury and terminating in a suitable Venturi or other tube $K^8$ disposed at the middle of the wing span, that is in the vertical medial longitudinal plane of the aeroplane in such a manner that during the flight of the aeroplane suction acts on the forward end of the mercury through the pipe $K^6$ while pressure acts on the rear end of the mercury, through the pipe $K^7$; the arrow Y represents the direction of flight of the aeroplane. Owing to the action of the pressure and suction on the ends of the mercury column the latter is maintained in a position with its forward end above and its rear end below the normal horizontal position as shown by the line Z Z, thus counterbalancing the inertia of the mercury. The position of the mercury container can be controlled by a hand lever N (see Fig. 3) within easy reach of the pilot so that it can be set to suit any angle of flight, the pipes $K^6$ $K^7$ being made flexible or otherwise arranged to permit of the angular movement of the container by moving the lever N. The mercury container $K^4$ is provided with two series of contacts connected to two sets of contacts on the sector D which latter are connected to the coils $G^2$, $H^2$ $G^{x2}$, $H^{x2}$ as above described. If for instance the aeroplane loses speed as a result of engine trouble or stoppage of the engine the pressure and suction effect on the mercury decreases owing to the reduction in speed with the result that the mercury moves from front to rear relatively to the container and engages with one set of contacts thus establishing an electric circuit for energizing the coils pertaining to the inlet and exhaust valves at one end of the cylinder to cause air to be admitted to the cylinder and thus effect the movement of the piston and sector so that the latter operates the controls and causes the aeroplane to dip and increase its speed; consequently the aeroplane can retain a minimum speed of flight. If however the aeroplane should dip and increase in speed, the pressure and suction effect would increase and cause the mercury column to move from the rear to the front thus establishing electrical circuit so that the apparatus is actuated to move the aeroplane control which causes the machine to rise or climb thereby reducing the speed. During normal flight any loss of equilibrium causing variation in the speed of the aeroplane will result in a corresponding variation in the pressure and suction effect and displacement of the mercury to enable the automatic stabilizer or controller to be brought into operation.

Figures 9, 14, 15:
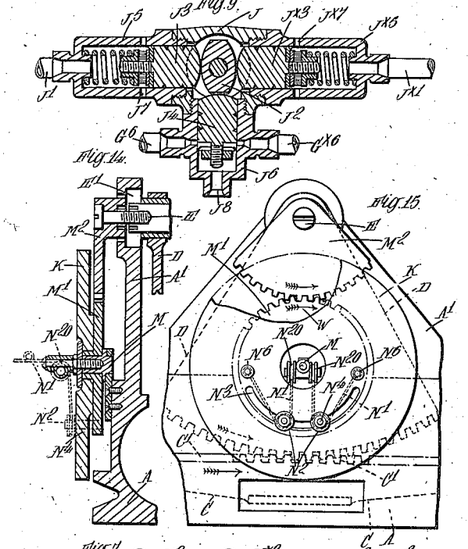
Fig. 9 is a sectional plan view of the main hand controlling valve.
Figs. 14 and 15 are detail views of parts used in connection with the modification shown in Figs. 12 and 13.
Figure 10:
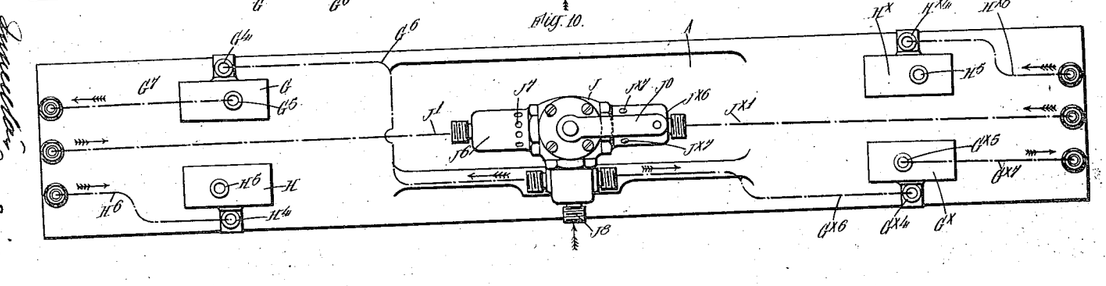
Fig. 10 is a diagrammatic plan showing a modified arrangement of the pipe connections for the air supply.
Figure 11:
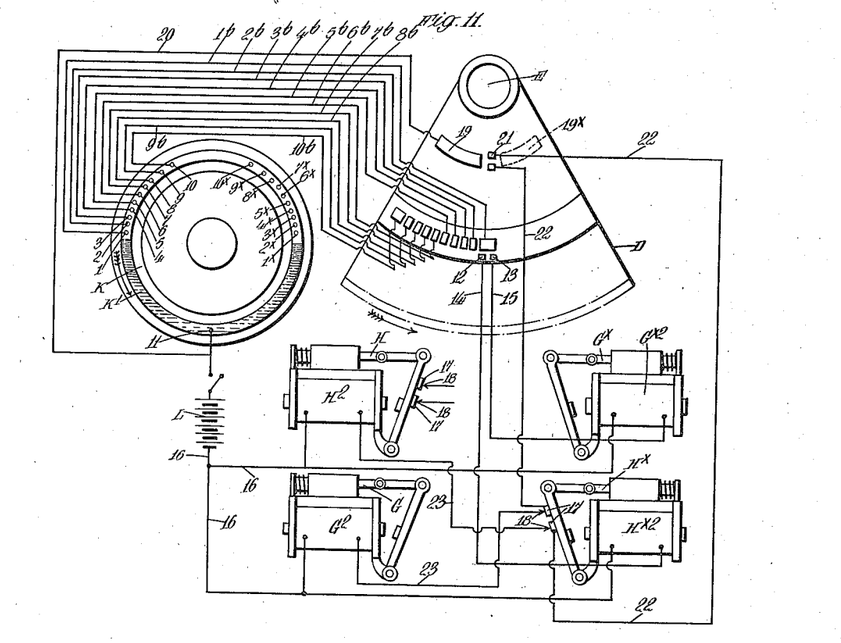
Fig. 11 is a diagram showing the electrical connections employed in conjunction with the modification shown in Fig. 10.

The modification shown in Figs. 10 and 11 permits of the use of a pump of less capacity than is required in the modification shown in Figs. 1 to 9. The main difference consists in so arranging the various inlet and exhaust valves that each end space of the cylinder is normally in communication with the air supply, (assuming the lever $J^0$ of the main valve has been adjusted to close the ports $J^7$ $J^{x7}$) instead of the latter being cut off when the piston is in its neutral or normal position as in the previous example. For this purpose the various valves may be arranged as previously explained but the two previous exhaust valves (which are normally open) are so connected to the main air supply valve J and to the cylinder as to serve as inlet valves while the two previous inlet valves (which are normally closed) now serve as exhaust valves but the valves occupy the same positions as aforesaid relatively to their ports. The valves which in this case are the inlet valves are lettered G, $G^x$ and the valves which in this case are the exhaust valves are lettered H, $H^x$ and the pipe connections to the inlet and exhaust valves and to the cylinders are the same as previously explained as will be understood from Fig. 10; the inlet valves are normally opened and the exhaust valves normally closed so that normally the two end spaces of the cylinder are in communication with the air supply through the pipes $G^6$, $G^{x6}$ and the pressure at both ends of the piston is balanced to maintain it in the neutral or normal position. As will be seen from Fig. 11 the electrical connections are different from the connection shown in Fig. 5 in the respect that the brushes 12 and 13 which coöperate with the contacts $1^a$ to $10^a$ on the sector connected to the contacts 1 to 10 at the left side of the mercury container, are connected respectively to the coil $H^{x2}$ (pertaining to the exhaust valve $H^x$) and the coil $G^{x2}$ (pertaining to the inlet valve $G^x$) at the right end of the cylinder, this difference in the connections being clearly understood by a comparison of Fig. 11 and Fig. 5. The connections from the contacts $1^x$ to $10^x$ at the right side of the mercury container are similarly cross connected to the coils $G^2$, $H^2$ pertaining to the inlet and exhaust valves G, H respectively, at the left side of the cylinder, these connections however not being shown in Fig. 11 as a description of the operation of the apparatus when the aeroplane turns to the left will suffice for a proper understanding of the invention.

Supposing the aeroplane banks or turns so that its left wing tip is lower than the right wing tip, the engagement of the contact 1 with the mercury column will result in the energization of the coils $H^{x2}$, $G^{x2}$ by the circuits above explained. Thus the inlet valve $G^x$ at the right (normally open) will be closed and the exhaust valve $H^x$ (normally closed) will be opened thus opening the right end of the cylinder to atmosphere while the inlet and exhaust valves G, H at the left end of the cylinder will remain in the normal position i. e., open and closed respectively; thus the air supply being cut off at the right end of the cylinder and this end of the cylinder being open to atmosphere result in a difference in the air pressure at the two ends of the cylinder, the greater pressure being at the left end, thus causing the piston B to move to the right and operate the controls as previously explained, the movement will depend on the extent of the relative displacement between the container and the mercury. If the relative displacement is such that the contacts 1 to 3 enter the mercury the movement of the piston and sector will cease when the contacts $4^a$ on the sector engages with the fixed brush 12 thus deënergizing the exhaust valve coil $H^{x2}$ and thereby causing the closing of the exhaust valve $H^x$, which in closing completes an independent circuit by contacts 17 and 18 as aforesaid thereby energizing the coils at the other end of the cylinder so that the inlet and exhaust valves at that end respectively close and open, thus opening the right end to atmosphere. When the controls have been operated by the piston B the sector D and the lever F the aeroplane in returning to its normal position will cause relative displacement to take place between the mercury and its container in the opposite direction; as the contact 3 leaves the mercury it will break the circuit through the coil $G^{x2}$ with the result that the coil becomes deënergized and thus allows the inlet valve $G^x$ to open by reason of its spring; therefore greater pressure of air occurs in the right end of the cylinder so that the return movement of the piston and the aeroplane controls, is effected until the parts reach the normal position a similar operation takes place when the aeroplane banks or turns in the opposite direction. With this modification the end spaces of the cylinder are normally in communication with the compressed air so that they are constantly under pressure thereby differing from the previous example in which the end spaces are normally closed to the air supply and must be fully charged before the piston can be moved after each return of the piston to its normal position; thus in the first case the air supply is to some extent intermittently controlled. This modification can be used for controlling the aeroplane in the longitudinal or fore and aft direction by arranging the cylinder A and the mercury container shown in Fig. 7 in a longitudinal plane of the aeroplane.

Figure 12:
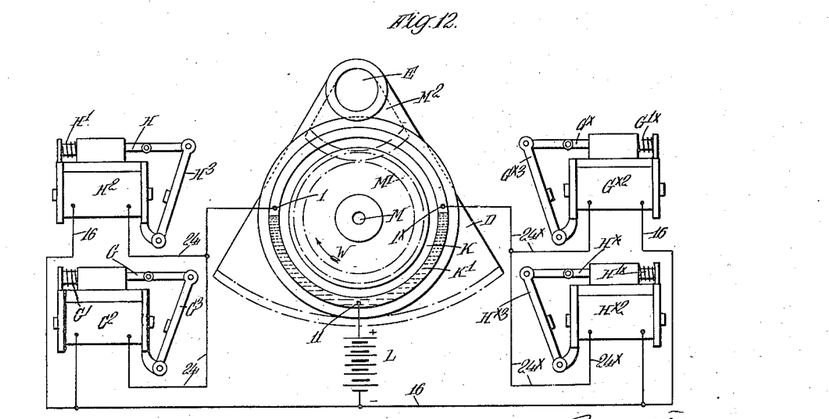
Figs. 12 and 13 are diagrams of electrical connections of further modifications hereinafter explained.
Figure 13:
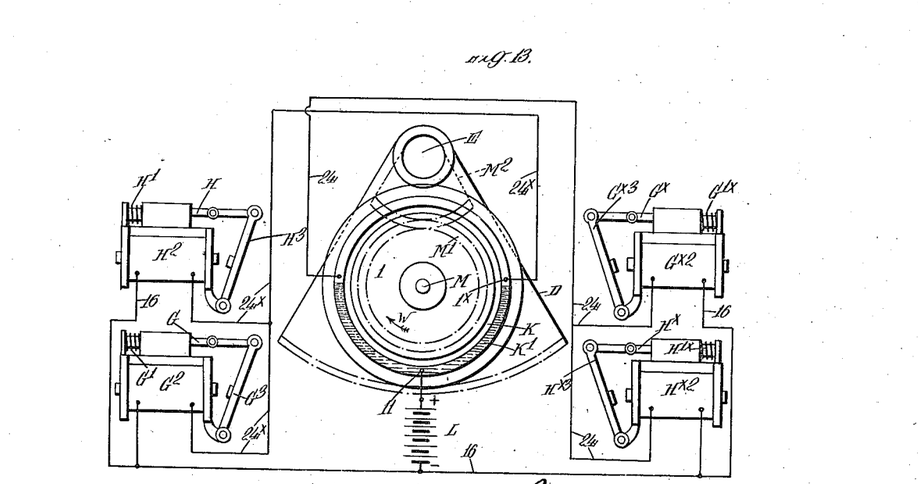

The modification shown in Figs. 12 to 14 differs from the two previous examples by the elimination of the series of contacts 1 to 10 or $1^x$ to $10^x$ on the left and right sides of the mercury container and the corresponding contacts on the sector D, the mercury container having only one contact 1 at the left side and one contact $1^x$ at the right side which contacts 1 and $1^x$ are connected by conductors 24, $24^x$ respectively to the coils $G^2$, $H^2$ and the coils $G^{x2}$, $H^{x2}$ as shown in Fig. 12 (when the intermittent air pressure supply explained in connection with Figs. 5 and 8 is used) or the conductors 24 and $24^x$ are respectively connected to the coils $H^{x2}$, $G^{x2}$ and the coils $H^2$, $G^2$ as shown in Fig. $12^a$ (when the constant air pressure supply explained in connection with Figs. 10 and 11 is used). The coils are designated in Fig. 12 to agree with those shown in Fig. 5 while the coils shown in Fig. $12^a$ are designated to agree with Fig. 11. In Figs. 12 and $12^a$ however the complete connections from the left and right sides of the mercury container are shown to the corresponding coils whereas in Figs. 5 and 11 only the complete connections from the left side of the mercury container to the respective coils are shown as previously explained.

In the modification shown in Figs. 12 to 14 the mercury container K is capable of being angularly moved by the toothed sector D for which purpose it is mounted on a spindle M and carries or is secured to a gear wheel M' (see Figs. 13 and 14) which is in mesh with a toothed quadrant $M^2$ secured or keyed to the spindle E on which the toothed sector D and the control lever F are secured or keyed. Supposing the aeroplane banks or turns so that its left wing tip is lower than the right wing tip the contact 1 will engage with the mercury thereby establishing circuit and energizing the coils for effecting the operation of the piston and the aeroplane controls, by either of the methods previously explained in connection with the first two modifications; owing to the movement of the piston to the right by the air pressure the toothed sector D in being moved to the right angularly moves the mercury container by means of the quadrant $M^2$ and the gear wheel M' in the direction of the arrow W, (see Figs. 12 and 14) that is in the opposite direction to the movement of the container which takes place when the aeroplane left wing becomes depressed. The mercury container therefore in being moved by the toothed sector, will cause the contact 1 to move out of engagement with the mercury so that the coils are deënergized. The mercury being maintained with its ends level, the contacts will by reason of the movement of the container assume a level position when they will be out of engagement with the mercury, but the aeroplane at this time will still be in the inclined position; the controls having been operated however as a result of the aforesaid engagement of the contact 1 with the mercury cause the aeroplane to commence its righting movement so that the container moves in the opposite direction and brings contact $1^x$ at the right side into the mercury thus establishing a circuit which energizes the valve coils at the other end of the cylinder so as to operate the valves and effect the return movement of the piston and the controls. This return movement of the piston causes the mercury container to be angularly moved in the opposite direction by the quadrant $M^2$ and gear wheel M' until such time that the aeroplane has assumed its normal or level position when the container in being moved by the said gearing moves its contact $1^x$ out of mercury thus breaking the circuit and stopping the return movement. When the aeroplane banks or turns in the opposite direction the contact $1^x$ engages with the mercury thus causing the operation of the piston B the sector D and the mercury container in the opposite direction.

Figure 16:
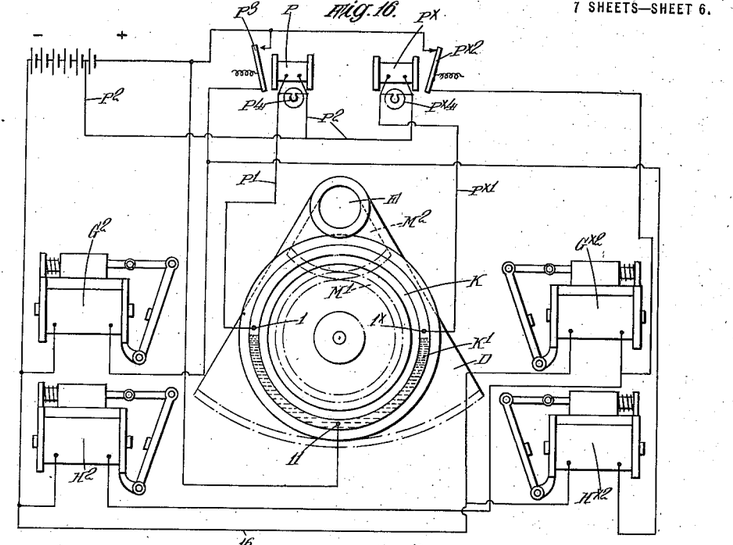
Fig. 16 is a diagram of electrical connections showing the relays which are interposed between the mercury switch and the electro-magnets which operate the air valves.

When the modification shown in Figs. 12 to 14 is utilized for controlling the aeroplane in the longitudinal direction, the disk is capable of angular adjustment at the will of the pilot by means of cables N' connected at $N^6$ to the support carrying the mercury container and passing around pulleys $N^2$, $N^{20}$, the said support being provided with a curved slot $N^3$ through which extend the pins $N^4$ carrying the pulleys $N^2$ and connected to the gear wheel M' so as to enable the support and mercury container to be angularly moved relatively to the gear wheel M' by pulling one or other of the cables N' according to the direction of angular adjustment required. Generally, a current of about twelve volts is required for operating the aforesaid electro-magnetic coils. It may be desirable not to employ a current of so high a voltage at the contacts in the mercury tube or container owing to sparking which may take place as the mercury leaves the contacts; therefore relays P, $P^x$ may be used (see Fig. 16) which are connected to the contacts 1, $1^x$ of the mercury tube K by conductors P', $P'^x$, the relays also being connected by a conductor $P^2$ to one of the two volt cells of the battery L in order that a two volt current flows through the relays and through the mercury K when the latter engages with the contact 1 or 1ˣ; thus the low voltage current prevents sparking at the contacts 1, 1ˣ in the mercury container. The relays control by means of their armatures P³, P³ˣ the circuits containing the electromagnets G², G²ˣ, H², H²ˣ pertaining to the valves controlling the air pressure to the aforesaid cylinder A, the operation being such that when one relay say P is operated as a result of relative displacement between the mercury and its container so that the contact 1 enters the mercury, the armature P² of this relay is attracted and completes the circuits which contain the electro-magnets that operate the valves for allowing the piston in the cylinder to be operated and the aircraft controls moved in the manner above described. The return movement of the aircraft controls is effected as above explained in connection with the modification shown in Figs. 12 to 15. Electric lamps P⁴, P⁴ˣ may be connected across the conductors P' and P² leading from the relays so that immediately relative movement takes place between the mercury and its container and a circuit is established through either one or other of the relays, the corresponding lamp is lighted, these lamps being conveniently placed on the instrument board of the aircraft, and thus forming an indicator or inclinometer to show the angular position of the aircraft. In this case all the valves are normally closed and the arrangement is such that when a relay is operated a valve at one end of the cylinder A is opened and a valve at the other end closed so that differential air pressure at the two ends of the piston takes place and causes movement of the latter as required. When the other relay is operated a similar operation in the reverse direction takes place.

Figure 17:
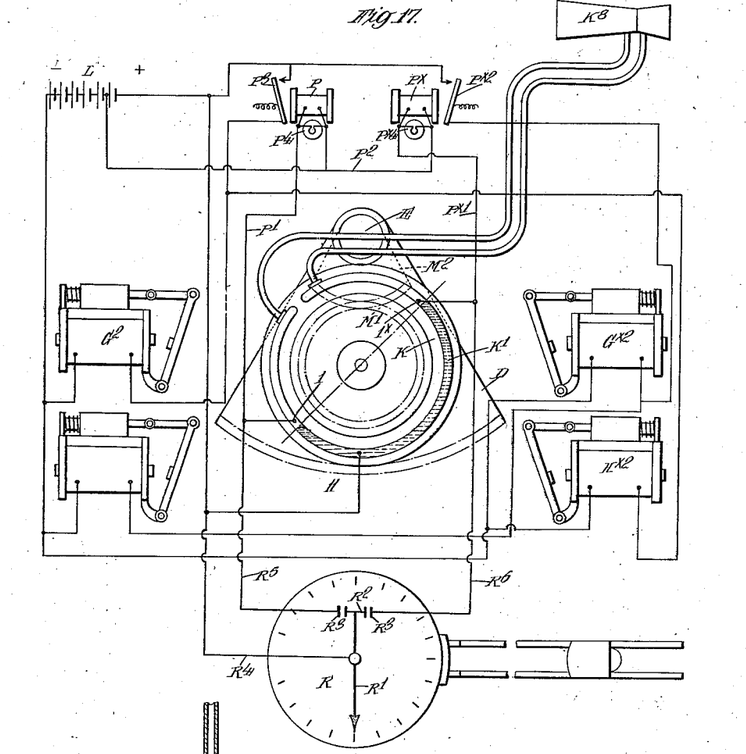
Fig. 17 is a diagram showing the device for insuring quick action of the apparatus when employed for fore and aft control.
Figures 18, 21, 22:
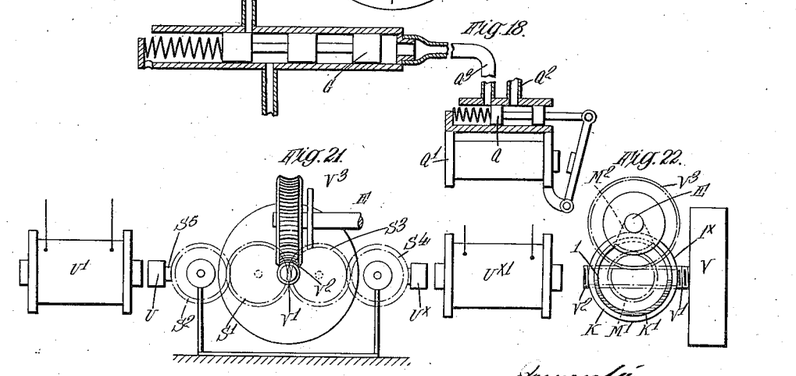

In order to render the mercury switch for fore and aft control sensitive to slightest changes in speed, an arrangement such as shown in Fig. 17 may be employed wherein an instrument R in the form of a speed indicator of known type or an instrument especially made for obtaining the same effect may be used. This instrument may be connected to a Pitot and static pressure tube already existing on the machine or it may be connected to the Venturi tube K⁸ which is connected to the mercury container K in order that the usual diaphragm therein may be moved by variations in the air pressure to move the indicating needle R' in the well known manner. The indicating needle R' may be provided with a double contact R² adapted to engage with one or other of a pair of contacts R³, R³ adjustably mounted on the dial of the instrument. The contact R² on the needle is connected by a conductor R⁴ to the mid-contact 11 in the mercury tube K and the two contacts on the instrument dial are respectively connected by conductors R⁵, R⁶ to the two contacts 1, 1ˣ of the mercury container and to the conductors P', P'ˣ leading from the relays P, Pˣ to the contacts 1, 1ˣ in the mercury tube. Should a change in speed take place, the speed indicator R being more sensitive than the mercury switch is first operated so that the needle R' by means of its contact R² engaging one or other of the contacts R³ closes a circuit through one or other of the relays in order that the electro-magnets G², G²ˣ, H², H²ˣ may be energized and the aforesaid air controlling valves operated. Subsequently the mercury column K' will engage with one or other of the contacts 1 or 1ˣ in the tube K and the operation will then be controlled by the movement of the mercury tube through the gear wheel M' and toothed sector M² as in the modification shown in Figs. 12 to 15. It is necessary to make the speed indicator capable of dealing with different ranges of speed and it is for that reason that the contacts R³, R³ on the dial are made adjustable so as to be moved nearer to or farther from the normal position of the needle by means of buttons operated by the pilot, the normal position of the needle R' being the position which it would assume for the normal or designed speed on the aircraft. In some cases the valves G, Gˣ, H, Hˣ instead of being moved by twelve volt electro-magnets as aforesaid may each be moved by air pressure which is controlled by a small valve Q operated by a two volt electro-magnet Q', see Fig. 18. When the magnet Q' is energized by the mercury switch or the Pitot switch it moves the valve to allow air admitted through a pipe Q² to flow through a pipe Q³ and move a valve G which controls the air pressure for operating the piston in the cylinder A according to any of the methods hereinbefore set forth.

Figure 19:
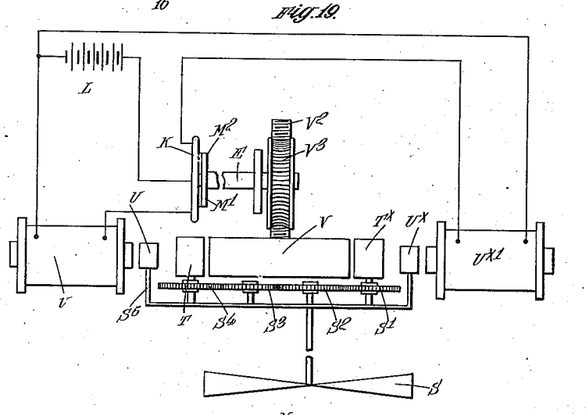
Figure 20:
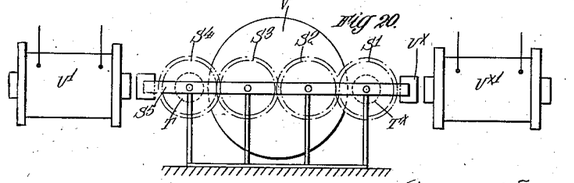

In the modification shown in Figs. 19 to 22 which shows a motor or contrivance that can be used instead of the aforesaid piston motor a wind driven fan S suitably mounted to rotate when the aeroplane is flying, imparts rotation to gear wheels S', S², S³, S⁴ in mesh as shown in Fig. 19 and so arranged that the end wheels S², S⁴ carrying friction wheels T, Tˣ rotate in opposite directions. The several gear wheels are supported on a sliding frame S⁵ carrying at its ends armatures U, Uˣ adapted to be attracted by electro-magnets U', U'ˣ to effect the sliding movement of the frame S⁵ so that one or other of the friction wheels T or Tˣ can be moved into contact with a large wheel V disposed between the two friction wheels. The energization of the one or other of the electro-magnets is effected by means of a mercury switch or the devices shown in Fig. 17 as hereinbefore described when relative movement between the mercury K' and container K takes place. When one or other of the electro-magnets U', U'ˣ is energized and the corresponding armature U or Uˣ attracted, the sliding frame S⁵ is moved in order that one or other of the friction wheels T or T' can rotate the large wheel V, the shaft V' of which drives through worm gearing V², V³ the shaft or spindle E which is suitably connected to the aeroplane controls. This shaft E also carries a tooth section M² in mesh with a gear wheel M' and secured to the mercury container K so that the movement imparted to the shaft E controls the mercury container as hereinbefore described.

What I claim and desire to secure by Letters Patent of the United States is:—

1. Controlling or stabilizing apparatus for aircraft comprising a mercury column in a container to form a gravity switch operated by relative movement between the mercury and container, means whereby said switch actuates electrical means for moving the aircraft controls to right the machine and for returning the controls to the normal position and means whereby the mercury column is placed under the influence of wind suction control produced as a result of the flight of the aircraft to counteract the effect of centrifugal force or inertia on the mercury column which is thereby controlled to insure that the required relative displacement between it and the container takes place.

2. Apparatus for use on aircraft comprising a mercury column in a container arranged in a transverse plane of the aircraft, Venturi tubes disposed at extended positions one on each side of the aircraft body or fuselage with their axes in the direction of flight, said Venturi tubes being connected by cross pipes to the ends of the mercury container whereby the mercury can be controlled to enable relative movement between it and its container to take place.

3. Controlling or stabilizing apparatus for aircraft comprising a device containing mercury under the influence of wind suction control produced by the flight of the aeroplane, electrically operated means connected to the said device and the mercury and operated as a result of relative displacement between the said device and the mercury, a cylinder containing a double-ended piston having a common rack rod in mesh with a gear segment connected to the aircraft controls, valves controlled by said electrical means and associated with said cylinder, these valves controlling the air pressure to the cylinder to operate the piston and the aircraft controls through said rack rod when the said valves are operated by the electrical means on relative movement taking place between the said device and the mercury.

4. Controlling or stabilizing apparatus for aircraft comprising a semi-circular mercury column in a circular mercury container, the ends of which are connected by pipes to Venturi tubes arranged with their axes in the direction of flight so that the mercury column is suction controlled, electrical contacts in said mercury container above the ends of the mercury column, a contact permanently in engagement with the mercury, electrical means operated as a result of relative movement between the mercury column and its container insured by the suction control, apparatus actuated by said electrical means in order to operate the aircraft controls and means whereby the aircraft controls after being moved are caused to return to the normal position by reverse operation of said electrical means.

5. Apparatus for controlling an aeroplane in the transverse direction comprising a device containing a mercury column, the two ends of which are under the influence of wind suction control to counteract the effect of a centrifugal force by connections to Venturi tubes on the wing tips, electrical means connected to said device and the mercury and operated by the device moving relatively to the container when the aircraft banks or turns at which time the mercury is restrained against movement which tends to be produced by the action of centrifugal force, valves moving by the electrical means which when operated allow air pressure at either end of a cylinder to move a piston connected to the aircraft controls by a member which in moving controls the electrical connections in a manner to cause the return movement of the piston to be effected.

6. Apparatus for controlling or stabilizing an aeroplane comprising a mercury controlled switch under the influence of suction produced by the flight of the aeroplane, which suction controls the mercury to insure relative displacement between it and the mercury container and geared to a shaft which is connected to and adapted to be actuated to move the aircraft controls.

7. Apparatus for controlling or stabilizing aircraft comprising a mercury container, the ends of which are connected to means for enabling the mercury to be placed under the influence of suction produced by the flight of the aircraft, two contacts diametrically opposite in said container just above the ends of the mercury column, a contact permanently in engagement with the said mercury column and a toothed wheel connected to said mercury container and in mesh with a toothed segment on a shaft connected to the aircraft controls.

8. Apparatus for controlling or stabilizing aircraft comprising pneumatically operated means for moving the aircraft controls, electrical means controlling the pneumatic means, a gravity switch controlled by wind suction control for controlling the said electrical means and a hand control valve for rendering said pneumatic means operable or inoperable and an electrical switch controlled by said hand operated valve for controlling the electrical circuits.

9. Apparatus for controlling or stabilizing aircraft comprising a semi-circular mercury column contained in a circular mercury container having two oppositely disposed contacts above the ends of the mercury column, a contact permanently in engagement with the mercury column and a toothed wheel carried by said container in mesh with a segment on a shaft which is connected to the aircraft controls and which carries a second toothed segment in mesh with a rack bar connecting two pistons in a cylinder whose ends can be placed in communication with an air supply for moving the piston in one direction or the other, the air supply being controlled by valves electrically operated as a result of relative displacement between the aforesaid mercury column and its container, which displacement is insured by placing the mercury under the influence of variations in suction produced by the flight of the aircraft.

10. Controlling or stabilizing apparatus for aircraft comprising a mercury switch in which the mercury is under the influence of wind suction control, a Pitot tube, a preliminary switch operated by said Pitot tube and means whereby said preliminary switch is connected to the aforesaid mercury switch.

11. Controlling or stabilizing apparatus for aircraft comprising a cylinder containing two pistons connected by a rod having a rack bar in engagement with a sector controlling the movement of a circular mercury container having a semi-circular mercury column, Venturi tubes connected to the ends of said mercury container above the ends of the semi-circular column, valves at the ends of said cylinder and electrical means associated with said valves and controlled by the relative movement between the mercury and its container, which movement is insured by the effect of wind pressure or suction produced by said Venturi tubes.

GEORGES AVELINE.